> United States Patent Office
2,921,936
Patented Jan. 19, 1960

2,921,936

4-AMINOALKYL-THIAZOLINE-2-ONES

George de Stevens, New Providence, N.J., assignor to Ciba Pharmaceutical Products, Inc., Summit, N.J., a corporation of New Jersey No Drawing. Application September 23, 1957
Serial No. 685,374

13 Claims. (Cl. 260—247.1)

This invention relates to thiazoline-2-ones, salts and quaternary ammonium compounds thereof and to the process for the preparation of such compounds. More particularly, the invention is concerned with thiazoline-2-ones of the formula:

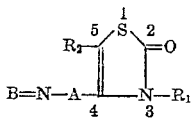

the salts and quaternary ammonium compounds thereof, as well as the process for preparing such compounds.

In this formula, A stands for a lower alkylene radical having from 1 to 7 carbon atoms, e.g. methylene, ethylene, 1,3-propylene, 1,2-propylene or 1,2-dimethyl-ethylene, etc.

The grouping —N=B stands for an amino group such as a primary amino, secondary amino or particularly a tertiary amino group. A tertiary amino group is, for example, an N,N-di-lower hydrocarbon-amino group, the hydrocarbon radicals of which contain from 1 to 7 carbon atoms, and is represented by N,N-di-lower alkyl-amino, e.g. dimethylamino, diethylamino, methylethylamino, dipropylamino or dibutylamino; N-lower alkyl-N-lower cycloalkyl-amino, e.g. N-methyl-N-cyclopentyl-amino or N-methyl - N - cyclohexyl-amino; N,N-di-lower alkenyl-amino, e.g. diallylamino; or N-lower alkyl-N-lower alkenyl-amino, e.g. N-methyl-N-allyl-amino. The group —N=B may also represent an N,N-alkylene-imino group containing in the alkylene chain from 4 to 6 carbon atoms which may be made up by carbon atoms or may contain a hetero atom such as oxygen, sulfur or nitrogen as a chain member. Furthermore, such an alkylene chain may contain additional substituents such as lower alkyl radicals, e.g. methyl or ethyl; hydroxyl; or acyloxy radicals e.g. acetoxy. Radicals representing such N,N-alkylene-imino groups are, for example, a pyrrolidino group, e.g. pyrrolidino or 2-methyl-pyrrolidino; piperidino group, e.g. piperidino, 2-, 3- or 4-methyl-piperidino, 3-hydroxy-piperidino or 3-acetoxy- piperidino; hexamethylene-imino, morpholino, thiamorpholine or a piperazino group e.g. $N^4$-methyl-piperazino, $N^4$-hydroxyethyl-piperazino or $N^4$-acetoxy-piperazino.

Monosubstituted amino groups are especially lower alkyl and lower cycloalkyl amino groups, containing from 1 to 7 carbon atoms, and are represented for example by methylamino, ethylamino, propylamino, isopropylamino, cyclopentylamino or cyclohexylamino groups.

$R_1$ stands for hydrogen or a lower hydrocarbon radical containing from 1 to 7 carbon atoms, and more especially for a lower alkyl or lower alkenyl radical, e.g. methyl, ethyl, propyl, isopropyl, butyl or allyl. In addition to that it stands for a monocyclic aryl or aralkyl radical, containing from 6 to 8 carbon atoms, e.g. phenyl, benzyl, or phenylethyl or substituted corresponding radicals, e.g. p-aminophenylethyl.

$R_2$ in the above formula stands for hydrogen or a lower hydrocarbon radical having from 1 to 7 carbon atoms. Such radicals are more especially lower alkyl radicals, e.g. methyl, ethyl, propyl, isopropyl or butyl; lower alkenyl radicals, e.g. allyl; monocyclic aryl or aralkyl radicals, e.g. phenyl or benzyl, the aryl nuclei of which may be unsubstituted or substituted, for example, by a halogen atom, e.g. chlorine, bromine; a lower alkoxy group, e.g. methoxy or by an amino group, e.g. free amino or dimethylamino.

Salts of the compounds of this invention are particularly therapeutically useful acid addition salts with inorganic acids, e.g. hydrohalic acids such as hydrochloric or hydrobromic acid; nitric or thiocyanic acid; sulfuric or phosphoric acids; or organic acids, e.g. acetic, propionic, glycolic, lactic, pyruvic, oxalic, malonic, succinic, maleic, fumaric, malic, tartaric, citric, benzoic, salicylic, p-aminosalicylic, 2-phenoxy-benzoic, 2-acetoxy-benzoic, cinnamic, mandelic, methane sulfonic, ethane sulfonic, hydroxyethane sulfonic, benzene or p-toluene sulfonic acid.

Quaternary compounds of the thiazoline-2-one compounds of this invention are particularly those with lower alkyl halides, e.g. methiodide, ethylbromide or propylchloride; lower alkenyl halides, e.g. allylbromide; or lower alkyl sulfate e.g. dimethylsulfate or diethylsulfate; or the corresponding hydroxides.

The compounds of this invention are capable of alleviating pain and are useful as analgesics. They may therefore be used as medicaments in the form of pharmaceutical preparations, which contain the new compounds or salts thereof in admixture with a pharmaceutical organic or inorganic solid or liquid carrier suitable for enteral or parental administration. For making up the preparations there can be employed substances which do not react with the new compounds, such as water, lactose, starches, magnesium stearate, talc, vegetable oils, benzyl alcohols, gums, polyalkylene glycols, or any known carrier for medicaments. The pharmaceutical preparations may be, for example, in the form of tablets or dragees, or in liquid form as solutions, suspensions or emulsions. If desired, they may contain auxiliary substances, such as preserving agents, stabilizing agents, wetting or emulsifying agents, salts for varying the osmotic pressure or buffers. They may also contain, in combination, other therapeutically useful substances. The new compositions contain preferably from 1 mg. to about 400 mg. of an active compound per dosage unit. The actual dose administered in therapy depends largely on the condition of the individual patient and the desires of the practicing physician.

Although a variety of methods may be employed for the preparation of the compounds of this invention, a particularly useful method, and one which is intended to be included within the scope of this application comprises reacting a ketone of the formula:

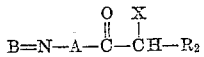

as well as its tautomeric form, wherein A, —N=B and $R_2$ have the meaning given above and X stands for a reactive esterified hydroxyl group such as a hydroxyl group esterified by a strong inorganic or organic acid, and represents especially a halogen atom, e.g. chlorine, bromine or iodine, or a salt thereof, with a thiocarbamate of the formula:

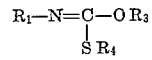

wherein $R_1$ has the meaning given above, $R_3$ represents a lower hydrocarbon radical, particularly a lower alkyl radical, e.g. methyl, ethyl, propyl, isopropyl or butyl, and $R_4$ represents hydrogen or lower alkyl, e.g. methyl, or a salt of such a thiocarbamate, such as an alkaline metal, e.g. sodium or potassium, salt; and, if desired, converting any resulting salt into the free base and/or, if desired, converting any base obtained into a salt or a quaternary ammonium compound.

Salts of the ketones used are acid addition salts, particularly those with acids of the formula HX, in which X has the above-given meaning; such acids are especially hydrohalic acids e.g. hydrochloric, hydrobromic or hydriodic acids. Also used may be acid addition salts with organic acids, e.g. acetic or p-toluene sulfonic acid.

The condensation reaction is carried out in the presence or absence of a solvent, at room temperature or at an elevated temperature, in an open or closed vessel under pressure, or in the presence of an inert gas such as nitrogen. The reaction is preferably carried out while heating either in the absence or in the presence of a solvent, such as an alcoholic solvent, for example, a lower alkanol, e.g. methanol, ethanol, propanol, isopropanol or butanol. A preferred embodiment of the invention consists in treating the salt, e.g. the hydrobromide, of a substituted α-halogeno-ketone, e.g. α-bromo-ketone, with a lower alkyl thiocarbamate, which may contain an unsubstituted or substituted nitrogen atom, in a lower alkanol, e.g. ethanol. The reaction of the ketone, containing in α-position a reactively esterified hydroxyl group, with a thiocarbamate as outlined above presumably results in the intermediary formation of a thiazole derivative containing an etherified hydroxyl group in the 2-position which under the conditions of the reaction is decomposed to the corresponding thiazoline-2-one derivative.

A hydrogen atom attached to the ring nitrogen of the thiazoline ring in any resulting 4-tertiary amino-alkyl-4-thiazoline-2-one may be replaced, for example, by converting an acid addition salt of the latter into an alkaline metal salt by treatment with an excess of a reagent capable of forming an alkaline metal salt and reacting the thus formed salt with an ester formed by a hydroxylated lower hydrocarbon with a strong acid, for example, hydrohalic acid e.g. hydrogen iodide, hydrogen bromide or hydrogen chloride; thus, lower hydrocarbon halides e.g. iodides, bromides and chlorides such as methyl iodide and ethyl chloride may be used. Alkaline metal salt forming reagents are particularly alkaline metal lower alkanolates e.g. sodium or potassium methanolate, ethanolate, propanolate or butanolate; a concentrated solution of an alkaline metal hydroxide e.g. sodium or potassium hydroxide, in water or in a lower alkanol, e.g. methol or ethanol; or the amides or hydrides of alkaline metals, e.g. lithium, sodium or potassium, preferably used in a hydrocarbon solvent, e.g. benzene, toluene or xylene; or in p-dioxane, etc.

The starting materials used to prepare the compounds of this invention are known or may be prepared according to methods which are known and generally applicable for the preparation of compounds of these types.

Depending on the conditions used the new compounds of this invention are obtained in the form of the free bases or salts thereof. The salts may be converted into the free bases in the customary way, such as by reaction with an alkaline reagent, e.g. sodium or potassium hydroxide. The bases may be transformed into their therapeutically useful addition salts by reaction with appropriate inorganic and organic acids, e.g. the acids outlined above.

The 4-tertiary amino-alkyl-4-thiazoline-2-ones of this invention may be converted into the quaternary ammonium compounds by reacting the tertiary bases with an ester formed by a hydroxylated lower hydrocarbon compound with a strong inorganic or organic acid. Hydroxylated lower hydrocarbon compounds contain from 1 to 7 carbon atoms and the esters thereof are more especially those with mineral acids, e.g. hydrochloric, hydrobromic, hydriodic or sulfuric acid. Such esters are, for example, lower alkyl halides, e.g. methyliodide, ethylbromide or propylchloride; lower alkenyl halides, e.g. allyl bromide; or lower alkyl sulfates, e.g. dimethylsulfate or diethylsulfate. The quaternizing reactions may be performed in the presence or absence of a solvent, at room temperature, at an elevated temperature, or under cooling, at atmospheric pressure or in a closed vessel under pressure. Suitable solvents are more especially lower alkanols, e.g. methanol, ethanol, propanol, isopropanol or butanol; or organic acid amides, e.g. formamide or dimethylformamide. When lower alkyl halides are used as quaternizing agents, formamide and dimethylformamide may be the preferred solvents and the reaction is advantageously run in a closed vessel under pressure, the latter being built up by heating.

Quaternary ammonium compounds obtained may be converted into the corresponding quaternary ammonium hydroxides, for example, by reaction of a quaternary ammonium halide with silver oxide, or by reaction of a quaternary ammonium sulfate with barium hydroxide or by treating a quaternary salt with an anion exchanger or by electrodialysis. From the resulting quaternary ammonium base there may be formed therapeutically useful quaternary ammonium salts by reaction with acids, such as the ones outlined for the acid addition salts. A quaternary ammonium compound obtained may also be converted directly into another quaternary salt without conversion into the quaternary hydroxide; for example, a quaternary ammonium iodide may be reacted with freshly prepared silver chloride to yield the quaternary ammonium chloride, or the quaternary ammonium iodide may be converted into the corresponding chloride by treatment with hydrochloric acid.

This is a continuation-in-part application of my application Serial No. 624,485, filed November 27, 1956, now abandoned.

The following examples are intended to illustrate the invention and are not to be construed as limitations thereon. Temperatures are given in degrees centigrade.

*Example 1*

1.02 g. of 1-diethylamino-4-bromo-3-butanone hydrobromide is dissolved in 20 ml. of boiling ethanol, 0.35 g. of methyl N-methyl-thiocarbamate is added and the solution is refluxed for one hour. The product is obtained by trituration of the ethanolic solution with 200 ml. of ether. The 3-methyl-4-(2-diethylamino-ethyl)-4-thiazoline-2-one hydrobromide of the formula:

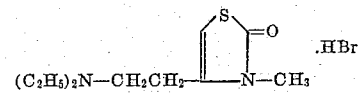

is recrystallized from ethanol, M.P. 165–167°.

*Example 2*

A mixture of 6.62 g. of 1-dipropylamino-4-bromo-3-butanone hydrobromide and 2.1 g. of ethyl N-methyl-thiocarbamate in 20 ml. of ethanol is refluxed for two hours and then chilled. The solution is treated with 200 ml. of ether and the 3-methyl-4-(2-dipropylamino-ethyl)-4-thiazoline-2-one hydrobromide of the formula:

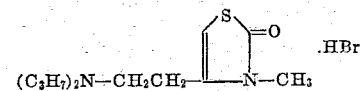

is collected and recrystallized twice from a mixture of ethanol-ether, M.P. 131–133°.

*Example 3*

A solution of 9.45 g. of 1-piperidino-(N)-4-bromo-3-butanone hydrobromide, and 4.0 g. of ethyl thiocarbamate in 50 ml. of ethanol is refluxed on the steam bath for four hours. After chilling overnight the crystals are collected; the 4-[2-piperidino-(N)-ethyl]-4-thiazoline-2-one hydrobromide of the formula:

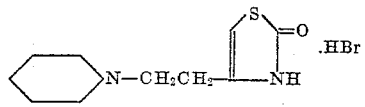

melts, after recrystallizing three times from ethanol, at 167–168°.

Example 4

A mixture of 2.4 g. of 1-piperidino-(N)-4-bromo-3-butanone hydrobromide and 1.0 g. of propyl N-methyl-thiocarbamate in 20 ml. of ethanol is refluxed for two hours. After chilling the precipitate is collected and the 3-methyl-4-[2-piperidino-(N)-ethyl] - 4-thiazoline-2-one hydrobromide of the formula:

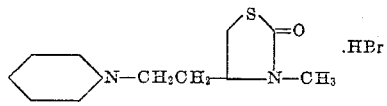

is recrystallized from ethanol to give white plates, M.P. 208–209°.

The 3-methyl-4-[2-piperidino-(N)-ethyl] - 4-thiazoline-2-one hydrobromide may also be obtained by refluxing 4-[2-piperidino-(N)-ethyl]-thiazoline-2-one hydrobromide in a solution of twice the molar amount of sodium in ethanol for 10 minutes, adding an equimolar amount of methyliodide and maintaining the reaction mixture at reflux temperature for an additional six hours. After evaporating the solvent under reduced pressure the residue is dissolved in ether and the ether solution dried over sodium sulfate. An excess of a solution of dry hydrogen bromide in ether is added and the collected 3-methyl-4-[2-piperidino-(N)-ethyl]-4-thiazoline - 2 - one hydrobromide is recrystallized from ethanol.

Instead of adding dry hydrogen bromide to the ether solution of the residue the latter may be dissolved in ethanol and treated with an excess of methyliodide, to thus yield the methyliodide of 3-methyl-4-[2-piperidino-(N)-ethyl]-4-thiazoline-2-one.

Example 5

A mixture of 10.2 g. of 1-morpholino-(N)-4-bromo-3-butanone hydrobromide and 3.6 g. of ethyl thiocarbamate in 50 ml. of ethanol is refluxed for six hours and the solvent is then stripped-off. The oily residue solidifies and is triturated with acetone. The solvent is removed; the collected 4-[2-morpholino-(N)-ethyl]-4-thiazoline-2-one hydrobromide of the formula:

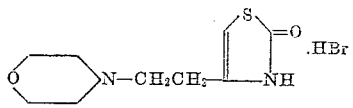

melts at 180°.

Example 6

The mixture of 6 g. of 1-[3-methyl-piperidino-(N)]-4-bromo-3-butanone hydrobromide and 1.9 g. of ethyl thiocarbamate in 100 ml. of ethanol is refluxed for 3 hours and worked up as described in Example 5. The 4-{2-[3-methyl-piperidino-(N)]-ethyl}-4-thiazoline - 2 - one hydrobromide of the formula:

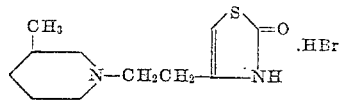

melts at 242°.

Example 7

A mixture of 6.35 g. of 1-diethylamino-5-bromo-4-pentanone hydrobromide and 2.1 g. of ethyl thiocarbamate in 40 ml. of ethanol is refluxed for 3 hours. An excess of ether is added and the resulting crystals collected. The 4-(3-diethylamino-propyl)-4-thiazoline - 2-one hydrobromide of the formula:

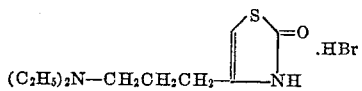

is recrystallized from ethanol, M.P. 218–221°.

The free base may be obtained from the hydrobromide salt by extracting a solution of the latter in a 2 percent aqueous solution of sodium hydroxide with ether and removing the ether. On addition of an ether solution of hydrogen chloride to an ethanolic solution of the free base, the corresponding hydrochloride of the 4-(3-diethylamino-propyl)-4-thiazoline-2-one may be obtained. If the ethanolic solution of the free base is treated with a concentrated solution of oxalic acid in ethanol, the corresponding oxalate may be collected.

Example 8

A mixture of 6.35 g. of 1-diethylamino-5-bromo-4-pentanone hydrobromide and 2.5 g. of ethyl N-methyl-thiocarbamate in 100 ml. of ethanol is refluxed for 3 hours and chilled overnight. The solvent is stripped-off, the residue triturated with acetone; the 3-methyl-4-(3-diethylamino-propyl)-4-thiazoline-2-one hydrobromide of the formula:

melts at 225–227° after recrystallization from ethanol.

Example 9

A mixture of 6.62 g. of 1-dipropylamino-4-bromo-3-butanone and 2.2 g. of ethyl thiocarbamate in 40 ml. of ethanol is refluxed for 4 hours, the solvent removed and the residue triturated several times with ether. The 4-(2-dipropylamino-ethyl)-4-thiazoline - 2 - one hydrobromide of the formula:

is recrystallized from a 1:1-mixture of acetone and ethanol, M.P. 120–121°.

Instead of using the 1-dipropylamino-4-bromo-3-butanone hydrochloride the 1-dipropylamino-4-chloro-3-butanone hydrochloride may be used as the starting material.

Example 10

A mixture of 4.5 g. of 1-dimethylamino-4-bromo-3-pentanone hydrobromide and 2.7 g. of ethyl thiocarbamate in 40 ml. of propanol may be refluxed for 3 hours, and worked-up according to the process described in Example 1, whereupon the 4-(2-dimethylamino-ethyl)-5-methyl-4-thiazoline-2-one hydrobromide of the formula:

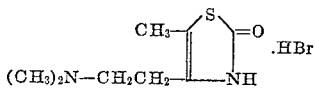

may be obtained.

By using the 1-dimethylamino-4-bromo-4-phenyl-3-butanone hydrobromide as the starting material the 4-(2-dimethylamino-ethyl)-5-phenyl-4-thiazoline-2-one hydrobromide of the formula:

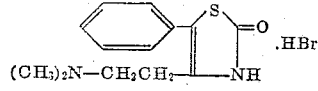

may be obtained.

From a broad point of view the invention comprises the preparation of the new compounds of the general method of reacting together compounds of the formulae:

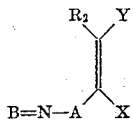

and

wherein A, B=N—, and $R_2$ have the above-given meaning, and wherein X and $X_1$ are substituents reacting together with the formation of the group:

in which $R_1$ stands for hydrogen or lower hydrocarbon, Y and $Y_1$ are substituents reacting together with the formation of the group —S—, and E represents an oxo group or a group which under the reaction conditions is converted into the oxo group such as, for example, an etherified hydroxyl group, and, if desired, converting any resulting salt into the free base and/or converting any free base obtained into a quaternary ammonium compound or a salt thereof. X, $X_1$, Y and $Y_1$ may appropriately be selected according to general chemical knowledge from the group of substituents consisting of free or reactive esterified or etherified hydroxyl groups, free or reactive etherified mercapto groups or free or mono-lower hydrocarbon substituted amino groups. An esterified hydroxyl group is especially a hydroxyl group esterified with a strong inorganic acid such as a hydrohalic acid, e.g. hydrochloric or hydrobromic acid; or a strong organic acid such as an organic sulfonic acid, e.g. p-toluene sulfonic acid. As an etherified hydroxyl group there may be mentioned especially a lower alkoxy group which is advantageously part of a carbalkoxy group. An etherified mercapto group is preferably an alkyl mercapto group. An etherified hydroxy group such as the one represented by the radical E is a lower hydrocarbonoxy group, more especially a lower alkoxy group, e.g. methoxy, ethoxy, propoxy, isopropoxy or butoxy group. In these compounds hydrogen atoms being part of the substituents X, and $X_1$, Y and $Y_1$ may give rise to tautomerism by shifting to the α-carbon atom and simultaneously accommodating the double bonds in the above formulae provided that the reactivity of the compounds involved for the purpose desired is not affected. This condensation reaction is carried out in the usual manner, if necessary, in the presence of condensing agents, e.g. alcoholates, amides or hydrides of alkaline metals.

A further method of preparing the new compounds consists in converting in a compound of the formula:

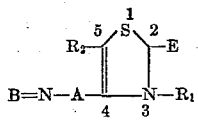

containing an additional double bond extending from carbon atom 2, and in which A, B=N—, $R_1$ and $R_2$ have the above-given meaning, and wherein E is a radical convertible into an oxo or hydroxy group, respectively, the radical E into such a group and, if desired, converting any salt obtained into the free base and/or converting any resulting base into a salt or a quaternary ammonium compound. E may be, for example, an etherified hydroxyl group, e.g. an alkoxy group; an esterified hydroxyl group, such as, a halogen atom, e.g. chlorine, bromine or iodine; or a methylene group. An esterified or etherified hydroxy group may be hydrolyzed in the usual manner, e.g. by treatment with alkali or strong acids, respectively. If the esterified hydroxyl group is a halogen atom, e.g. chlorine, it can be converted directly into the hydroxyl group by treatment with a metal hydroxide, e.g. silver hydroxide, or may be first converted into an etherified hydroxyl group such as an alkoxy group by treatment with an alkaline metal alcoholate, e.g. sodium methylate or potassium ethylate. The alkoxy group is then split, for example, by treatment with hydrochloric acid. These steps can also be combined by treating a 2-halogeno-thiazole with the desired alcohol and a strong acid such as a mixture of methanol or ethanol with hydrochloric acid. An unsubstituted or substituted methylene group in 2-position may be oxidatively degradated to an oxo group. Such a substituted methylene group is more especially a dicarbalkoxy-methylene e.g. dicarbethoxy-methylene group.

The starting materials used in these processes may also be formed in reactions where conditions apply which convert them into the desired end products according to one of the above-described processes. Thus, as shown in the beginning, a salt of an α-halogeno-ketone may be, for example, reacted with ethyl thiocarbamate which presumably results in the intermediary formation of a 2-ethoxy-thiazole which under the conditions of the reaction is decomposed to the corresponding 4-thiazoline-2-one.

My invention also comprises any modification wherein a compound obtainable as an intermediate in any step(s) of the process of the invention is used as starting material and the remaining steps are carried out.

What is claimed is:

1. A member of the group consisting of thiazoline-2-ones of the formula:

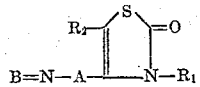

wherein A represents a lower alkylene radical, the grouping B=N— stands for a tertiary amino group in which each of the two N— substituents designated as B represents a member selected from the group consisting of lower alkyl, lower alkenyl, cyclopentyl, cyclohexyl and the two N-substituents taken together with the nitrogen atom, represent a member selected from the group consisting of an N,N-alkyleneimino group containing in the alkylene chain 4 to 6 carbon atoms, an N,N-oxaalkyleneimino group containing in the alkyene chain 4 to 6 carbon atoms, an N,N-azaalkyleneimino group containing in the alkylene chain 4 to 6 carbon atoms, an N,N-thiaalkyleneimino group containing in the alkylene chain 4 to 6 carbon atoms, and $R_1$ and $R_2$ each stand for a member of the group consisting of hydrogen and a hydrocarbon ardical of 1 to 7 carbon atoms, the therapeutically useful acid addition salts and lower alkyl and lower alkenyl quaternary ammonium compounds thereof.

2. Thiazoline-2-ones of the formula:

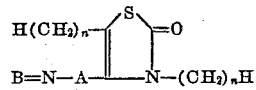

wherein the grouping B=N— stands for an N,N-di-lower alkyl-amino group and n is an integer from 0 to 7, inclusive.

3. Thiazoline-2-ones of the formula:

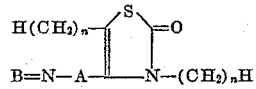

wherein the grouping B=N— stands fo ran N,N-alkyleneimino group containing in the alkylene chain 4 to 6 carbon atoms and n is an integer from 0 to 7, inclusive.

4. 4-[2-piperidino-(N)-ethyl]-4-thiazoline-2-one.

5. 3 - methyl - 4-[2-piperidino-(N)-ethyl]-4-thiazoline-2-one.

6. 3-methyl-4-(2-diethylamino-ethyl)-4-thiazoline-2-one.

7. 4-(2-dipropylamino-ethyl)-4-thiazoline-2-one.

8. 3-methyl-4-(2-dipropylamino-ethyl)-4-thiazoline-2-one.

9. 4-[2-morpholino-(N)-ethyl]-4-thiazoline-2-one.

10. 4-{2-[3-methyl-piperidino-(N)]-ethyl}-4-thiazoline-2-one.

11. 4-(3-diethylamino-propyl)-4-thiazoline-2-one.

12. 3-methyl-4-(3-diethylamino-propyl)-4-thiazoline-2-one.

13. In a process for the preparation of a member of the group consisting of thiazoline-2-ones of the formula:

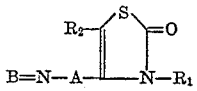

wherein A represents a lower alkylene radical, the grouping B=N— stands for a tertiary amino group in which each of the two N-substituents designated as B represents a member selected from the group consisting of lower alkyl, lower alkenyl, cyclopentyl, cyclohexyl and the two N-substituents taken together with the nitrogen atom, represent a member selected from the group consisting of an N,N-alkyleneimino group containing in the alkylene chain 4 to 6 carbon atoms, an N,N-oxaalkyleneimino group containing in the alkylene chain 4 to 6 carbon atoms, an N,N-azaalkyleneimino group containing in the alkylene chain 4 to 6 carbon atoms, an N,N-thiaalkyleneimino group containing in the alkylene chain 4 to 6 carbon atoms, and $R_1$ and $R_2$ each stand for a member of the group consisting of hydrogen and a hydrocarbon radical of 1 to 7 carbon atoms, the therapeutically useful acid addition salts and lower alkyl and lower alkenyl quaternary ammonium compounds thereof, the step which comprises contacting a member of the group consisting of a ketone of the formula:

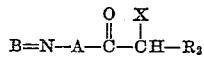

wherein A, B=N— and $R_2$ have the above-given meaning, and X represents a halogen atom, and a salt thereof, with a member of the group consisting of a thiocarbamate of the formula:

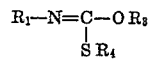

wherein $R_1$ has the meaning given above, $R_3$ stands for a lower hydrocarbon radical and $R_4$ for a member of the group consisting of hydrogen and a lower alkyl radical, and a salt thereof.

References Cited in the file of this patent

UNITED STATES PATENTS 2,854,456     Mizzoni  ------------ Sept. 30, 1958